United States Patent Office 3,359,218
Patented Dec. 19, 1967

3,359,218
FIRE RETARDANT URETHANES AND ORGANIC ANTIMONY POLYOL COMPOUNDS THEREOF
Robert A. Wiles, Syracuse, N.Y., assignor to Allied Chemical Corporation, New York, N.Y., a corporation of New York
No Drawing. Filed Dec. 23, 1963, Ser. No. 332,880
2 Claims. (Cl. 260—2.5)

This invention relates to a novel class of polyethers containing antimony and more particularly relates to hydroxyl-containing polyethers which contain at least one

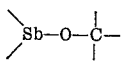

linkage, said polyethers being useful for the preparation of fire retardant urethanes.

Urethane polymers are prepared by reacting an organic polyisocyanate and a poly-functional active hydrogen-containing substance, e.g., a polyester, a polyesteramide or a polyether polyol, usually in the presence of a catalyst, surfactant, and other adjuvants. When the reaction is conducted in the presence of a blowing agent, cellular polymers result.

The active hydrogen-containing substances referred to in this specification are those substances containing hydrogen which will react with methyl magnesium halides to liberate methane in the well-known Zerewitinoff procedure (Houben-Weyl: Methoden der Organischen Chemie, 4 Auf. Band 2, p. 318).

Urethane polymers are not, generally, in themselves, fire resistant; that is, they will ignite on contact with a flame source, and once ignited, continue to burn until substantially completely consumed. It is known to confer upon these urethane polymers fire retardance or fire resistance by the inclusion of agents, both inorganic and organic, the degree of fire retardance obtained being roughly proportional to the amount of such agents added. Moreover, it has been found that the inclusion of such agents inevitably alters the physical and/or chemical properties of the resultant urethane polymers, often deleteriously.

It is, therefore, a principal object of this invention to devise a novel class of active hydrogen-containing organic antimony compounds which are useful in the preparation of urethane polymers.

A further object is to devise poly-functional active hydrogen-containing compounds containing at least once, the

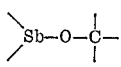

linkage.

Another object is to devise urethane polymers possessing a high degree of fire retardance.

Other objects will be apparent from the following description of this invention.

This invention is directed broadly to organic antimony compounds containing at least once, the

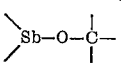

linkage and at least three groups capable of reacting with organic isocyanate (hereinafter termed "isocyanate reactive groups") of which the antimony-containing group is at least one, said compounds on hydrolysis of the

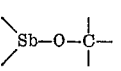

linkage(s) yielding a polyol having at least three active hydrogen-containing groups, and an equivalent weight of at least 30.

The compounds of my invention are antimonate (III) esters, or mono- or di-halostibine derivatives having the formula

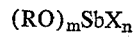

wherein m is a whole number 1, 2 or 3;
n is an integer, 0 to 2;
the sum of $m+n$ being 3;
X is a halogen, chlorine and bromine;
RO— is an organic radical bound to the antimony through the oxygen and being selected from the group consisting of alkoxy
hydroxyalkyleneoxy
epoxyalkyleneoxy
epoxyhydroxyalkyleneoxy radicals, the thioanalogues thereof in which the oxygen atom of RO—, is replaced by a divalent sulfur atom, and derivatives of these radicals which in addition to carbon, hydrogen and oxygen (or sulfur) contain one or more atoms of the group consisting of chlorine, bromine and nitrogen.

In the above definitions, "alkyleneoxy" includes polyoxyalkyleneoxy, "alkoxy" includes "polyalkyleneoxy," and alkyl and alkylene radicals may contain from 2 to 35 carbon atoms. The groups defined by R may be aliphatic, aromatic and heterocyclic (in which oxygen, sulfur and/or nitrogen are the heterocyclic atoms), moieties and also may contain ketonic, aldehydic, carboxylic, acetal, amino, amido, ureido and ureylene groups.

The compounds of this invention which are described by the above formula contain at least three isocyanate reactive groups, one of which is the antimony-containing group. The equivalent weight of these compounds, per isocyanate reactive group, should be at least 80. Upon hydrolysis of the

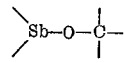

linkage(s) they give rise to at least one polyol having at least three active hydrogen-containing groups, said polyol having an equivalent weight per active hydrogen-combining group of at least 30. Preferably, such polyols have an equivalent weight per active hydrogen-containing group of at least 40, and especially from 40 to 2000.

Those polyols which contain hydroxyl groups and

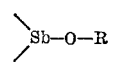

groups are especially preferred since particularly desirable results have been obtained when such compounds have been used.

Organic antimony compounds are known in the art and may be prepared by heating antimony trioxide with an alkanol or antimony trichloride with an alkoxide or an alkanol in the presence of a base, or by heating antimony trichloride with an oxirane compound.

Thus, ethyl antimonate (III) is prepared by heating ethanol and antimony trichloride in the presence of a base, e.g. the sodium salt of the alcohol, ammonia and the like.

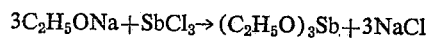

Similarly, the reaction of ethylene glycol and antimony trichloride in the presence of ammonia gives $3C_2H_4(OH)_2 + 2SbCl_3 + 6NH_3 \longrightarrow$
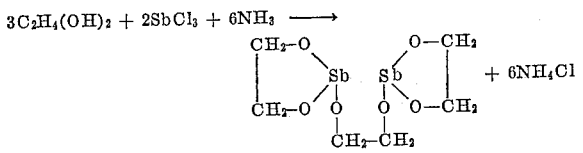

The use of less than the equivalent amount of alkanol in this reaction produces chlorostibines and dichlodostibines, as indicated in the following equations:

$$RONa + SbCl_3 \rightarrow ROSbCl_2 + NaCl$$
$$2RONa + SbCl_3 \rightarrow (RO)_2SbCl + 2NaCl$$

Oxirane compounds, e.g., 1,2-propylene oxide, can serve as the base in this reaction as indicated by

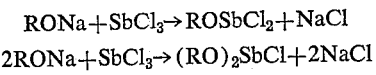
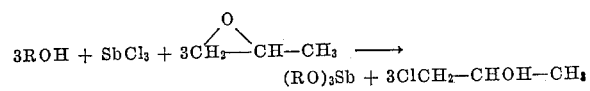

Oxirane compounds are known also to react directly with antimony trichloride to form antimony (III), stibinous derivatives, depending upon the relative proportions used.

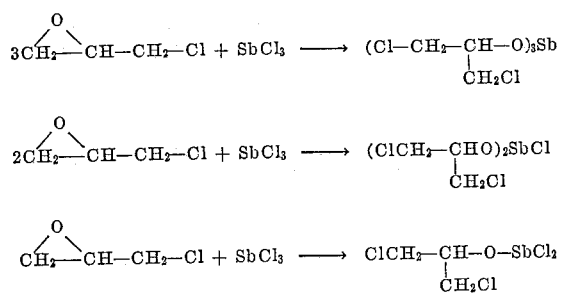

Antimonate (III) esters may be prepared by transesterification; that is, by mixing an alkyl antimonate (III) with an alkanol.

$$(C_2H_5O)_3Sb + 3C_8H_{17}OH \rightarrow (C_8H_{17}O)_3Sb + 3C_2H_5OH$$

No catalyst is required for this transesterification reaction. In those instances wherein the alcohol of the original ester is more volatile than the transesterifying alcohol, the reaction may be driven substantially to completion by distillation of the more volatile alcohol from the reaction mixture. In other instances, the transesterified product is probably an equilibrium mixture.

$$(RO)_3Sb + 3R'OH \rightleftharpoons (R'O)_3Sb + 3ROH$$

Chlorostibines and dichlorostibenes also undergo this transesterification reaction in the absence of a base or other acid accepting substances. It will be apparent to those skilled in this art that thio-analogues of the above alcohols will behave in a substantially similar manner.

In the reaction of a polyol and polyisocyanate in the presence of an organic antimony compound of the novel class disclosed herein, it is believed that the antimony compound reacts with the isocyanate compound in a manner similar to the polyol. Thus,

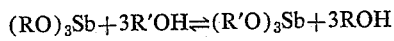

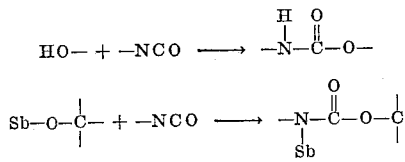

Each group is capable of reacting with one isocyanate group. Thus, antimonate (III) compounds can react with three isocyanate groups.

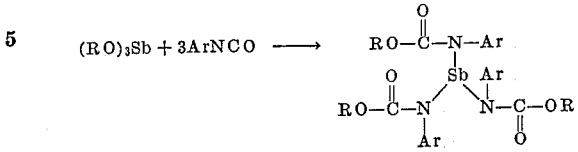

Similarly, a monochlorostibine will react with two isocyanate groups and a dichlorostibene derivative will react with one isocyanate group. Each

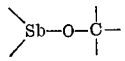

group present in the molecule is considered to be one "isocyanate reactive group" and is in this respect equivalent to one active hydrogen-containing group.

The novel class of organic antimony compounds of this invention can be prepared according to this and other reactions; that is, by reaction of an antimony halide with a polyol-containing active hydrogen-containing group, or mixture of polyols at least one of which contains active hydrogen-containing groups, said polyols containing preferably one or more 1,2-epoxy groups.

The polyols suitable for use in the preparation of the novel organic antimony compounds can be selected from a broad class of poly-functional derivatives including:

(a) Poly-functional polyesters such as the reaction products of adipic acid, phthalic acid and trimethylol propane, or the reaction product of phthalic acid and a mixture of propylene glycol and glycerine. These polyesters should have a low acid number (below 10), a high hydroxyl number (above 400) and be substantially free from water. Comparable polyesters, having terminal hydroxyl groups such as those obtainable by known procedures from polybasic acids, such as sebacic, glutaric, phthalic, halogenated phthalic, hydrogenated phthalic, succinic, fumaric, maleic, citric, and the like acids as well as mixtures thereof, with polyols such as ethylene glycol, propylene glycol, glycerol, sorbitol, polypropylene glycol and the like as well as mixture thereof, can be used also. Especially suitable are polyesters which contain halogens such as those derived from 1,4,5,6,7,7-hexachlorobicyclo-(2,2,1)-5-heptene-2,3-dicarboxylic acid ("HET Acid").

(b) Poly-functional polyesteramides wherein part to all of the polyol compound of the above described polyesters has been replaced by an amine derivative such as diethylenetriamine, ethanolamine, etc.

(c) Poly-functional polyethers containing a plurality of hydroxyl groups and believed to have the general formula

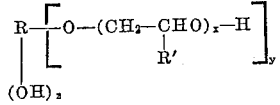

wherein R is the residue of a polyol as exemplified below; R' is hydrogen, methyl, halomethylene or phenyl. X is an integer from 1 to 35; y is an integer from 1 to 10 and z is an integer from 0 to 9. Preferably, these polyether polyols contain from 3 to 10 hydroxyl groups which are reactive with isocyanate groups and have hydroxyl values in the range of from about 200 to 750, preferably from 370 to 620. Such polyether polyols can be obtained by the action of an alkylene oxide such as ethylene oxide, propylene oxide, epichlorohydrin, epibromohydrin, trichloropropylene oxide, styrene oxide or mixtures thereof either alone or in admixture with polyhydric alcohols and/or polyhydric phenols in the presence of suitable catalysts such as trialkylamines, e.g. trimethylamine or inorganic bases, e.g. potassium hydroxide, or a metal halide, e.g. boron trifluoride. The polyols suitable for producing these poly-functional polyethers include glycerol, trimethylol propane, hexanetriol, sorbitol, hexetol, mannitol, sucrose, tetraphenylolethane, triphenylolpropane, resorcinol, pyrogallol, para, para'-isopropylidenediphenol, chlorinated diphenol and mixtures thereof. Polyethers corresponding to these types are described in the prior art including such patents as U.S.P. 2,902,478, U.S.P. 2,927,918 and Belgium Patent 584,738, the disclosures of which are herein included by reference.

Preferably, the polyethers used herein are those which contain in addition to hydroxyl groups a high percentage of halogen (bromine or chlorine) attached to carbon atoms vicinal to the carbon atoms bearing hydroxyl groups, and which by treatment with basic substances, e.g. caustic soda, are convertible to 1,2-epoxy groups. Examples of such desirable polyethers are the reaction products of an epihalohydrine and a polyol or mixture of polyols such as glycerin, sorbitol and the like prepared in the presence of a catalyst, e.g. fluoroboric acid or a metal halide, e.g. boron trifluoride. Polyethers of this type are known in the prior art including U.S.P. 2,260,753, U.S.P. 2,528,932, U.S.P. 2,538,072, U.S.P. 2,564,194, U.S.P. 2,792,381 and J. Am. Chem. Soc. 75, 1735, the disclosures of which are herein included by reference. A portion of these polyols may be replaced by monohydroxyl compounds of aliphatic, aromatic or heterocyclic nature, e.g. butanol, octanol, phenol, phenethyl alcohol, 3-(3-pyridyl)butanol-1, and the like.

In accordance with a preferred method of preparing the preferred class of organic antimony compounds of this invention, a polyether polyol containing a plurality of 1,2-halohydrin groups is prepared in a known manner and then treated with an inorganic alkaline material in the presence of a solvent for the polyether. The product containing a plurality of 1,2-epoxide groups, as well as a plurality of hydroxyl groups, is washed with water to remove inorganic halides and the solvent removed. Thereafter, the epoxy polyether is reacted with antimony chloride in amount sufficient to convert all or a part of the epoxy (and/or hydroxyl) groups to organic antimony derivatives. The characteristics of the resultant antimony derivative will depend in a large measure upon the polyether polyol used. Thus, a product desired for use in the manufacture of rigid urethane polymers will be prepared from a highly functional polyol which is derived from a highly functional initiator, e.g. pentaerythritol, sorbitol, etc., and only one or two moles of alkylene oxide or halogenated epoxide per hydroxyl of the initiator. On the other hand, a product intended for flexible urethanes starts with a low functionality initiator, e.g. propylene glycol, glycerine, etc. and about 17 or more moles of alkylene oxide per hydroxyl (or other active hydrogen-containing group) is used.

The resultant products of the reaction of the polyfunctional polyol initiator and alkylene oxide or preferably chlorinated epoxide can serve as starting materials for the novel class of organic antimony compounds. In the latter case, the addition of the chlorinated epoxides to the polyol initiator is made using an acid catalyst and hence, as will be evident to those skilled in this art, initiators containing carbonyl groups or their derivatives such as acetal groups as present in sucrose, should not be used. Sucrose (an acetal-containing polyol) initiated polyether polyols can be converted to organic antimony derivatives by transesterification with an organic antimony compound, e.g. ethyl antimonate (III), dichloroethoxy stibene, or chloro-bis(1-bromo-2-propoxy)stibine.

The broad scope of this invention includes the replacement of one or all of the halogen atoms of an antimony halide by the same or different polyols which may be mono- or poly-functional. The amount of antimony halide used can be aimed over a broad range also, said amount be less than, equal to, or more than that required to react with all of the hydroxyl and/or 1,2-epoxy groups, present in the polyol or mixture of polyols. The polyol component used can be a mixture of polyols, one containing 1,2-epoxide groups and the other containing essentially terminal hydroxyl groups. The resultant product is probably a mixture resulting from the transesterification of the originally formed organic antimony product resulting from reaction of the 1,2-epoxide groups with the antimony halide and subsequent reaction thereof with the terminal hydroxyl groups of the other polyol. The reaction is possibly quite complex and involved, and the products are probably both intramolecular, wherein the antimony is bound through oxygen to two carbon atoms which in turn are linked to each other by chemical bonds in addition to the

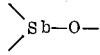

bond, and intermolecular, wherein the antimony is bound through oxygen to carbon atoms which are not linked to each other by any other means. Examples of these two types of organic antimony compounds can be illustrated by the following structural formulae which are indicative of the types of compounds probably present rather than the predominant molecular species.

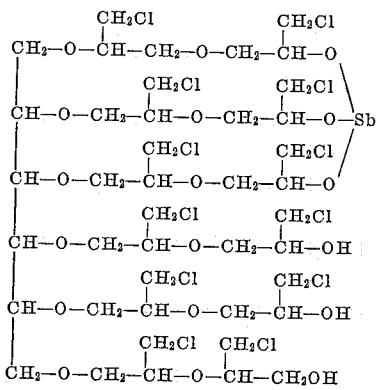

This is an intramolecular antimonate ester which may be present in the reaction mixture obtained by reacting sorbitol and epichlorohydrin, treating the initial product with an alkaline material and subsequently reacting the epoxy polyol with an antimony trihalide. The product represented by this structure has six isocyanate reactive groups, one trireactive antimony and three monoreactive hydroxyls.

The polyether polyol, obtained by the reaction of glycerine with 1,2-propylene oxide, on reaction with antimony trichloride in the presence of base, may give rise to an intermolecular product having the formula

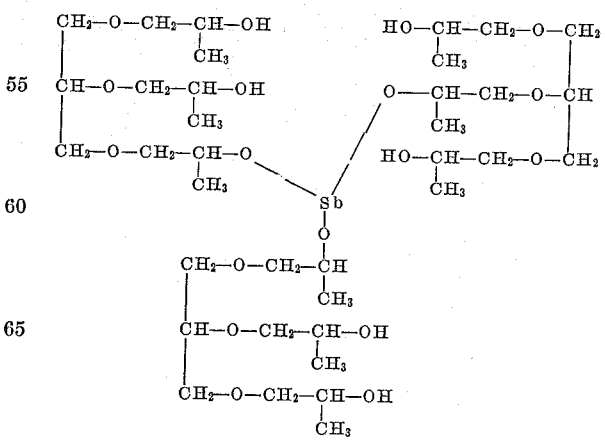

This intermolecular antimonate (III) has 9 isocyanate reactive groups; one trireactive antimony and six monoreactive hydroxyls.

A polyester derived from "HET Acid" and glycerol might on reaction with chlorodiethoxystibene result in an intramolecular organic antimony polyester polyol (having seven isocyanate reactive groups) of the probable formula

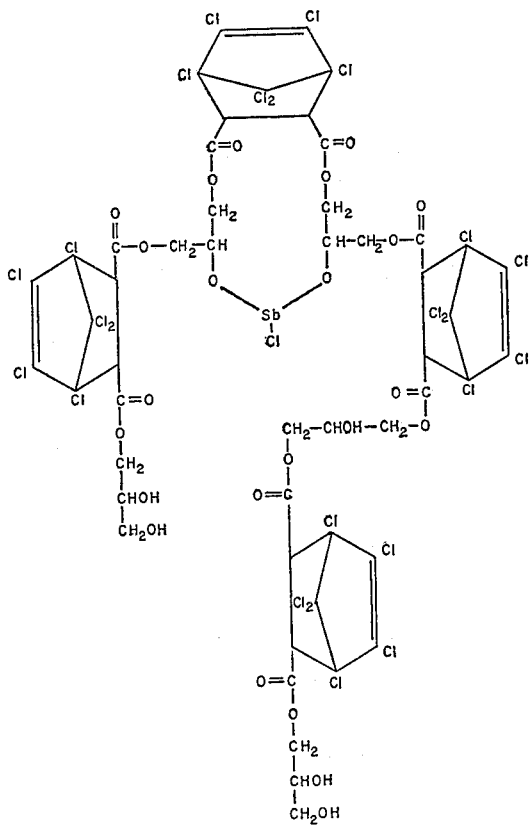

A polyether polyol derived from sucrose and 1,2-propylene oxide transesterified with chlorodiethoxystibene might produce an intermolecular antimony polyether polyol (having sixteen isocyanate reactive groups) of the probable formula

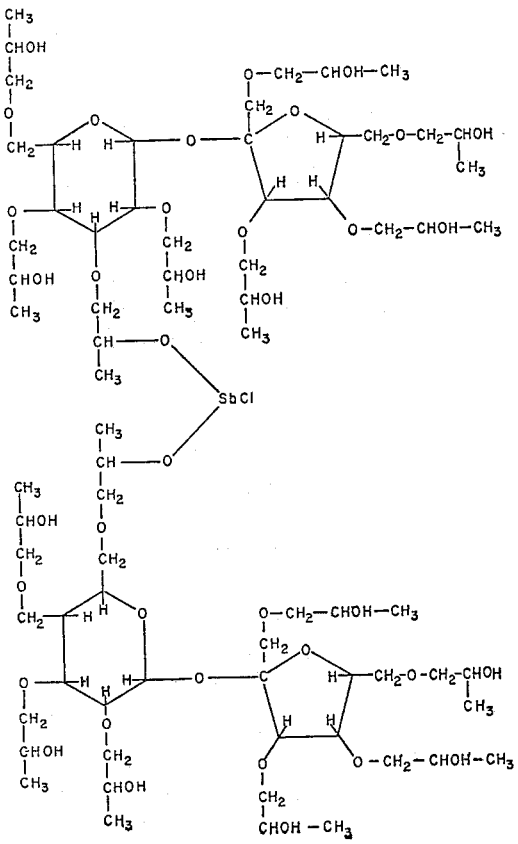

Another molecular species of organic antimony compounds of this invention is that which might result from the transesterification of the product of reaction of glycerol and 1,2-propylene oxide and dichloroethoxystibene. Such a product has three isocyanate reactive groups and the probable formula

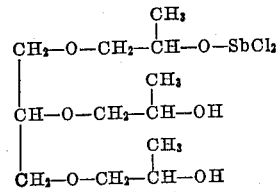

This compound is most likely in equilibrium with the isomeric dichlorostibene of the probable formula

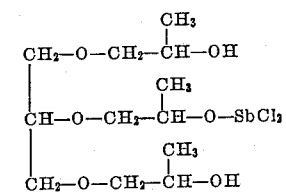

The reaction between the antimony halide and epoxy polyol is generally exothermic and hence the reaction course may be followed by observing the rate and duration of heat evolution. The reaction can be effected over a broad range of temperatures, from about 0° to 150° C. or higher, preferably from about 50° to 120° C. The time required for completion of the addition reaction is not critical, it being necessary merely to permit the initial exotherm to moderate. The reaction product requires no complicated isolation procedure; the entire mass may, after cooling, be utilized directly or stored for extended periods.

The organic antimony compounds of this invention, and especially those of the preferred class, are rather viscous materials. Accordingly, it is preferred to prepare them in the presence of a solvent or diluent which seems to reduce or modify this viscosity characteristic. The solvent may be non-reactive, e.g. methylene chloride, or more preferably the solvent is a hydroxyl-containing polyether such as a polyoxyalkylene polyol, e.g. polyoxypropylated glycerin or sorbitol, and mixtures thereof. Such diluent compounds not only serve to improve the viscosity characteristics of the resultant reaction mixture, but also, by transesterification with the primary reaction produced, may also form antimony-containing polyether polyols.

The preferred method of preparing the compounds of this invention involves the addition of antimony halide to an oxirane compound. This method is preferred because it is not only accomplished readily and with relative ease, but also because the resultant product contains a substantial proportion of organically bound halogen which is generally desirable in materials intended for use in fire retardant applications. An alternate procedure involves the transesterification of compounds containing a $$\diagdown\!\!\!\!\!\!\diagup\!\!\text{Sb}\!-\!\text{O}\!-\!\overset{|}{\underset{|}{\text{C}}}\!-$$

group and a polyol. This reaction proceeds in the absence of catalysts and is usually effected with the mild application of heat to obtain a convenient reaction rate. In those instances where the group attached to the antimony is derived from an alcohol boiling at a lower temperature than the polyol being esterified, the reaction can be carried to completion by distilling the lower boiling alcohol from the reaction mass. In other instances, the reaction mass consists of the equilibrium mixture of the transesterification components. As indicated above, the preferred products, wherein an epoxy polyether is reacted with an antimony halide in the presence of a diluent polyether polyol, the reaction product is believed to be a mixture comprising not only the products of reaction of the epoxy compounds and antimony halide but also transesterified products derived from the primary reaction product and the polyether polyol.

The more detailed practice of the present invention will be illustrated by the following examples in which parts and percentages are by weight and temperatures are given in degrees centigrade.

*Example 1*

A mixture of 405 parts of sorbitol and 2595 parts of epichlorohydrin is reacted at 100° C. in the presence of 4 parts of boron trifluoride etherate as catalyst in a known manner. The resulting polyether polyol contains a plurality of chlorohydrin groups. The product has a hydroxyl number of 250 and contains 33.3% chlorine.

The polyether (3000 parts) is warmed to about 40° and then diluted with about 1300 parts of methylene chloride. The solution is cooled to 15°, and 858 parts of 50% aqueous sodium hydroxide is added at below 20°. The mixture is agitated for about ½ hour. The aqueous layer is separated and discarded. The organic portion is washed with water containing sufficient acetic acid to neutralize any residual alkaline material. The neutral organic portion is washed twice with water and then dried over anhydrous magnesium sulfate. The dried solution, after filtration from the drying agent, is distilled to remove solvent.

The solvent-free residue has an oxirane oxygen content of 4.7%. This corresponds to an equivalent weight of 340 per oxirane group. The equivalent weight based on the residual hydroxyl groups is 500. The solvent-free residue weighs 2161 parts.

A portion (438 parts) of the epoxy polyether prepared above is mixed with 581 parts of a polyoxypropylene polyol having a hydroxyl equivalent weight of 119.5 and the mixture is warmed to 40°. Thereafter, 70 parts of antimony trichloride are added. The temperature of the mixture increases spontaneously to about 70°. The mixture is permitted to stand and to cool to ambient temperature. The resultant product contains a 40% excess of oxirane groups over that required to react with the antimony added, and has a theoretical hydroxy equivalent weight of 193, an antimonate equivalent weight of 1185 and a combination hydroxy-antimonate equivalent weight of 166; that is, 166 parts of the product theoretically contains one equivalent of isocyanate reactive group (OH or —OSb) as indicated by the following calculation.

Equivalent weight/isocyanate reactive group =

$$\frac{\text{Wt. of material}}{\text{Eq. OH} + \text{Eq. } \frac{\text{OSb}}{3}} = \frac{581 + 438 + 70}{\left(\frac{581}{119.5} + \frac{438}{500}\right) + \left(\frac{438}{340}\right)(0.6)} =$$

$$\frac{1089}{(4.86 + 0.876) + 0.775} = 166$$

This theoretical value is confirmed by two different analytical procedures. The first, a hydroxyl number determination wherein pyromellitic anhydride instead of conventional acetic anhydride is used as the esterifying agent (Analytical Chem. 31, 900 (1961)), gives a value of 346 mg. KOH/gm. which corresponds to an equivalent weight/isocyanate reactive group of 162. The second determination, by means of an isocyanation procedure described below, gives a result of 340 or an equivalent weight/isocyanate group of 164.

The isocyanation procedure referred to above is carried out by dissolving a weighed sample of the product in dry bis(2-methoxyethyl)ether and reacting the solution with excess (about 100%) of phenylisocyanate at ambient temperature for 40 minutes. A measured amount of dibutylamine is added to consume the excess of phenylisocyanate and the excess amine is back-titrated with standard hydrochloric acid. Since chlorostibenes also react with amines, a blank is run prior to isocyanation and the amine consumed is corrected for the amount of amine consumed in the blank. The net figure obtained gives a value for isocyanate reactive groups.

Eq. wt./isocyanate reactive group =

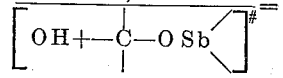

$$\frac{56,100}{\left[OH + -\overset{|}{\underset{|}{C}} - O\,Sb\diagup^{\#}\right]} =$$

$$\frac{\text{Grams of sample}}{\text{G. eq. of HCl} - \left(\begin{array}{cc}\text{G. eq. of} & \text{G. eq. of} \\ \text{amine} & \text{phenylisocyanate}\end{array}\right)}$$

*Example 2*

A mixture of 149 parts of glycerol, 148 parts of sorbitol, 3200 parts of epichlorohydrin and 6 parts of boron trifluoride etherate is caused to react at 90°. The resulting polyether polyol containing halohydrin groups is dissolved in methyelne chloride and treated with 624 parts of 50% aqueous sodium hydroxide as described in Example 1 above to convert about 53% of the halohydrin groups to 1,2-epoxy groups.

The solvent-freed product weighs 2888 parts and contains 2.5% oxirane oxygen. This corresponds to an equivalent weight of 640 per oxirane group. The equivalent weight per hydroxyl group is 653.

To 250 parts of this oxirane compound heated to 100°, 29.75 parts of antimony chloride are added at a rate such as to maintain the temperature between 100° and 110°. Thereafter, the reaction mass is heated at 100°–110° for one hour. The resulting antimonate compound has an equivalent weight per isocyanate group of 362.

*Example 3*

A mixture of 246 parts of glycerol, 2754 parts of epichlorohydrin and 4.2 parts of boron trifluoride etherate is reacted and the resulting polyether polyol polychlorohydrin is treated with 514 parts of 50% aqueous sodium hydroxide as described in Example 1 above to convert the chlorohydrin groups to 1,2-epoxy groups.

The resulting epoxy polyether polyol, freed of solvent, contains 2.5% oxirane oxygen. This corresponds to an equivalent weight of 640 per epoxy group. The equivalent weight based on hydroxyl value is 790.

To 300 parts of this oxirane compound, 35.7 parts of antimony trichloride are added at about 100° as in Example 2 above. The resultant antimonate compound has an equivalent weight per isocyanate reactive group of 395.

*Example 4*

A mixture of 2000 parts of polyether LK–380, a mixture of (a) the propylene oxide adduct of tris-(hydroxyphenyl) propane having a hydroxy number of 250 and (b) the propylene oxide adduct of glycerine having a hydroxyl number of 633, in the proportion such that the hydroxyl number of the mixture is 380. 1272 parts of epichlorohydrin and 4 parts of boron trifluoride etherate is reacted and the polyether polyol chlorohydrin is treated with 885 parts of 50% aqueous sodium hydroxide as described in Example 1 above to convert the chlorohydrin groups to 1,2-epoxy groups.

The resulting product weighs 2546 parts and contains 4.5% oxirane oxygen. This corresponds to an equivalent weight of 350 per oxirane group. The equivalent weight per hydroxyl group is 540.

To a mixture of 300 parts of the above prepared oxirane compound and about 175 parts of dry toluene at 100°, 64.2 parts of antimony trichloride are added while maintaining the temperature at 100° to 110°. The mixture is heated at 100° to 110° for two and one-half hours. Thereafter, the clear reaction mixture is heated at 80° under a vacuum of 30 mm. Hg for about 9 hours to remove toluene substantially completely. The resultant antimonate compound has an equivalent weight per isocyanate reactive group of 263.5.

Example 5

A mixture of 2100 parts of a polyether polyol derived from sorbitol and propylene oxide, having a hydroxyl number of 502 and 630 parts of 1,3-dichloro-2-propyl antimonate (III) is heated to 120° in a vacuum of 1–2 mm. Hg. After 482 parts of 1,3-dichloro-2-propanol distills from the mixture, the distilland, containing the transesterified polyether antimonate (III) is cooled to ambient temperature. This product has a hydroxyl number of 440 and a viscosity of 56,300 cps. at 25°. The product contains 6.76% Sb and has a hydroxyl equivalent weight of 150, an antimonate equivalent weight of 604 and an equivalent weight/isocyanate reactive group of 128 (calculated value 120).

Example 6

In a nitrogen atmosphere, 215 parts of a glycerol-sucrose initiated polyoxypropylene polyol having a hydroxyl number of 460 and 143 parts of the solvent-free epoxy polyether prepared in Example 1 above and having an oxirane oxygen content of 4.7%, is heated to 95°. To this mixture, 32 parts of antimony trichloride are added over a period of about 40 minutes, while maintaining the temperature of the reaction mixture at 100 to 110°. Thereafter, the flow of nitrogen is ended and as the mass is being cooled, 109 parts of trichloromonofluoromethane is slowly added. Following this addition, the mixture is cooled to ambient temperature. About 1.9 parts of water is added over a period of about 20 minutes and the mixture is agitated for about 30 minutes, thereafter, to thoroughly mix the batch. The mixture is run into containers purged with nitrogen and sealed.

This mixture is designed for use in the preparation of cellular urethanes and requires merely the addition of a small amount of emulsifying agent, e.g., silicone block copolymer such as Dow Corning 113, prior to reaction with organic polyisocyanates in the usual manner. The inclusion of the small amount of water in this mixture serves to moderate the urethane formation reaction, a procedure which is disclosed and claimed in co-pending U.S. application Ser. No. 332,881, filed Dec. 23, 1963.

Example 7

A mixture of 42.5 parts of the epichlorohydrin polyol prepared as described in Example 1 above, 63.5 parts of the polyether polyol containing antimony prepared as described in Example 5 above, 1 part of a silicone-glycol block copolymer having a hydroxyl content of 1.5% (Dow Corning 113) and 30 parts of trichloromonofluoromethane is agitated until thoroughly blended. To this mixture, 93.5 parts of polymethylene polyphenylisocyanate) is added. The mixture is agitated for 10 seconds and then poured into a suitable mold wherein it was allowed to rise freely. After "aging" at room temperature for about 24 hours, the cellular product is "non-burning" in character when tested according to A.S.T.M. D–1692. A more striking test of the fire-resistant character of this cellular urethane is one carried out as follows:

A slab of the cellular urethane product, one inch thick, is laid on a tripod and exposed to the flame of a propane torch directed to the underside of the test piece at the center thereof. The torch is adjusted so that the blue inner cone of the flame is 1½ inches in length and 2½ inches below the test piece. The flame does not burn through the test piece in 10 minutes; a continuous char is formed and resists further burning.

Example 8

A mixture of 110 parts of the antimonate (III) containing polyether polyol prepared as described in Example 1 above, 0.4 part of water, 1 part Dow Corning 113 silicone oil surfactant, and 30.4 parts of trichloromonofluoromethane is thoroughly blended together. To this mixture is added 91.3 parts of polymethylene polyphenylisocyanate and the mass is agitated for 20 seconds. The "creamed" mixture is poured into a suitable mold. The foaming mass rises for 70 seconds and is "tack-free" after 110 seconds. The mass is aged at ambient temperature for about 24 hours. When tested according to A.S.T.M. D–1692, the cellular product is rated as "non-burning." When exposed to the flame of a propane torch, as described in Example 7 above, the foam withstood the flame for 10 minutes without burning through.

This invention has been described and illustrated with reference to specific embodiments thereof. While these include my preferred products and the best way known to me for preparing them, it will be obvious to those skilled in the art, that variations in the details set out in these specific examples can be made without departing from the scope or spirit of my invention. Thus, in place of antimony trichloride, antimony tribromide can be used.

I claim:

1. A cellular urethane produced by reacting an organic polyisocyanate with a polyether polyol in the presence of a blowing agent and a hydroxyl containing polyether of the formula:

$$X_n\text{—}Sb\text{—}(OR)_m$$

wherein
  $n$ is an integer of from 0 to 2 and
  $m$ is an integer of from 1 to 3,
  the sum of $m+n$ being 3,
  X is chlorine or bromine and
  OR is the residue of a polyether polyol having a hydroxyl number of from about 200 to 750, and wherein the hydrogen atoms of from one to three hydroxyl groups of said polyether polyol have been removed, said polyether polyol having the formula:

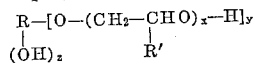

wherein R is the residue of an organic polyol having from 3 to 10 hydroxyl groups and wherein the hydrogen atoms of from one or more of the hydroxyl groups of said organic polyol have been removed,
  R' is hydrogen, methyl, halomethylene or phenyl,
  $x$ is an integer from 1 to 35,
  $y$ is an integer from 1 to 10,
  $z$ is an integer from 0 to 9, and
  the sum of $y$ plus $z$ being an integer of from 3 to 10.

2. A cellular urethane according to claim 1 wherein OR is the residue of a polyether polyol having a hydroxyl number of from 370 to 620.

References Cited

UNITED STATES PATENTS

| | | | |
|---|---|---|---|
| 2,511,013 | 6/1950 | Rust et al. | 260—446 |
| 3,054,760 | 9/1962 | Worsley et al. | 260—2.5 |
| 3,055,850 | 9/1962 | Worsley et al. | 260—2.5 |
| 3,099,676 | 7/1963 | Lanham | 260—2.5 |
| 3,109,853 | 11/1963 | Worsley et al. | 260—446 |
| 3,245,957 | 4/1966 | Hindersinn et al. | 260—2.5 X |
| 3,288,830 | 11/1966 | Stallings et al. | 260—2.5 |

DONALD E. CZAJA, *Primary Examiner.*

LEON BERCOVITZ, *Examiner.*

G. W. RAUCHFUSS, *Assistant Examiner.*